Patented Jan. 13, 1953

2,625,542

UNITED STATES PATENT OFFICE 2,625,542

AZO DYES FROM 2-AMINOTHIOPHENE

Robert Sidney Long, Bound Brook, N. J., assignor to American Cyanamid Company, New York, N. Y., a corporation of Maine No Drawing. Application October 19, 1950, Serial No. 191,084

8 Claims. (Cl. 260—152)

This invention relates to azoic coloring matters prepared from 2-(2'-hydroxy-3'-naphthoylamino)-thiophene by coupling said substituted aminothiophene compound with diazotized aromatic amines free from water-solubilizing groups, such as the so-called "ice color" diazo compounds, all as more fully hereinafter described and claimed.

The azoic compounds so prepared are stable azo compounds containing a thiophene nucleus in a certain relation to the azo groups thereof, as more fully shown post. As a class, these stable azo compounds are insoluble in water and have other advantageous properties which render them useful as pigments as well as dyestuffs. In particular, they are strong colors and have good fastness properties. In general, these azoic coloring matters are useful and advantageous as dyestuffs and pigments in dyeing textiles and in coloring other materials.

In particular, the azoic coloring matters of the present invention are stable, water-insoluble azo compounds having the following generic formula

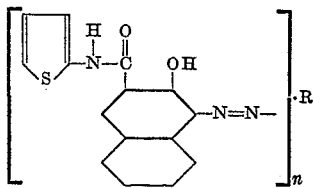

wherein R is an aromatic carbocyclic radical free of water solubilizing groups and $n$ is a positive integer less than 3 such as 1 or 2.

In preparing such azoic coloring matters, I use a particular coupling component, namely, 2-(2'-hydroxy-3'-naphthoylamino)-thiophene and couple it with the diazo compound to introduce a thiophene nucleus into the resulting azo compound in the desired relation to the azo group thereof, as is further described and illustrated post.

This particular coupling component is an acylated derivative of 2-aminothiophene and is a compound having the following formula:

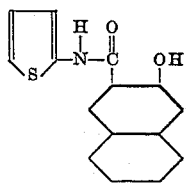

This 2-(2'-hydroxy-3'-naphthoylamino)-thiophene is a stable compound whereas 2-aminothiophene is very unstable. Further, 2-(2'-hydroxy-3'-naphthoylamino)-thiophene readily couples with various diazo compounds, such as the so-called "ice color" diazo compound, to form azo compounds in which the azo group is attached to the naphthoyl radical of said substituted 2-aminothiophene compound, as is shown in the generic formula given ante.

This 2-(2'-hydroxy-3'-naphthoylamino)-thiophene is a new chemical compound and is described and claimed by me as such in my copending companion application, Ser. No. 191,083, filed October 19, 1950, simultaneously with the present application.

In my co-pending application Ser. No. 191,083, I also described methods of preparing 2-(2'-hydroxy-3'-naphthoylamino)-thiophene from 2-aminothiophene wherein the unstable 2-aminothiophene is converted into the stable 2-(2'-hydroxy-3'-naphthoylamino)-thiophene. As stated in said application, 2-aminothiophene is extremely unstable and readily oxidizes in air to a solid mass. Accordingly, heretofore, it had little or no practical utility in the manufacture of azo dyestuffs or intermediates useful in the manufacture thereof. On the other hand, in the methods described in my said application, Ser. No. 191,083, the unstable 2-aminothiophene is converted into a stable derivative thereof which is useful in making azo dyestuffs. In doing so, the unstable 2-aminothiophene is formed, in situ, in the reaction mixture and is reacted with 2-hydroxy-3-naphthoyl chloride to convert it into a stable derivative thereof, namely, 2-(2'-hydroxy-3'-naphthoylamino)-thiophene.

In the present invention, the 2-(2'-hydroxy-3'-naphthoylamino)-thiophene is further converted into other stable compounds which contain both an azo group and a thiophene ring in a certain relation to each other and which are useful as dyestuffs and pigments.

Thus, my companion application Ser. No. 191,083 relates to 2-(2'-hydroxy-3'-naphthoylamino)-thiophene and methods of making the same whereas the present application relates to azo compounds prepared from 2-(2'-hydroxy-3'-naphthoylamino)-thiophene.

In the present invention, the 2-(2'-hydroxy-3'-naphthoylamino)-thiophene is used as a coupling component to introduce a thiophene ring into the azo dyestuffs in a certain relation to the azo group thereof. Further, it has other advantages in making such dyestuffs. For instance, 2-(2'-hydroxy-3'-naphthoylamino)-thiophene, readily couples with practically all ice color diazo compounds and a wide variety of azoic coloring matters are produced which are characterized by good application and fastness properties. The colors may be prepared in various forms. Thus, for example, pigments may be produced with or without substrates and textile materials can be dyed by the customary procedure used with ice colors. Thus, for example, such cellulosic materials may be impregnated or padded with an alkaline solution of the said coupling component and the cloth then dyed by immersion in a solution of diazo compound; or the padded cloth may be printed by a printing paste containing such a diazonium salt. Another method of utilizing the dyestuffs of the present invention consists in mixing the said coupling component with a water-soluble diazo amino or diazo imino compound, together with the conventional alkali and thickener, to form a printing paste. This is then printed on the fiber and the print developed in the usual manner by exposure to the hot vapors of an organic acid, such as acetic or formic acids. Printing may also be effective with a mixture of the said coupling component, a diazo sulfonate and an oxidizing agent, dissolving the mixture in dilute alkali and producing a printing paste with a customary thickener. After printing on the textile material, the color can then be developed by treatment with steam in the presence of weakly acidic vapors.

The fact that the said coupling component of the present invention couples so readily with practically all ice-color diazo compounds, renders the present invention useful for the production of a wide range of colors. Typical diazo or tetrazo compounds which can be coupled with the 2-(2'-hydroxy-3'-naphthoylamino)-thiophene to produce the dyestuffs of the present invention are those obtained by diazotizing aniline, its homologs and halogen, nitro, alkoxy, aryloxy, acylamino, sulfone, sulfonamide and cyano derivatives, xenylamine, the various naphthylamines, amino azo compounds, benzidine and its derivatives, such as dichlorobenzidine, dianisidine, and the like, diamino stilbenes, etc. The ready coupling of the 2-(2'-hydroxy-3'-naphthoylamino)-thiophene also makes it suitable for the production of polyazo dyes, in which a polyamino compound is diazotized and coupled in stages. Polyazo dyes may be prepared, in which different diazo components are present and, of course, these polyazo dyes may also contain another coupling component, such as any of the conventionally used ice-color coupling components.

The present invention will be illustrated in greater detail in conjunction with the following specific examples, in which the parts are by weight unless otherwise specified.

*Example 1*

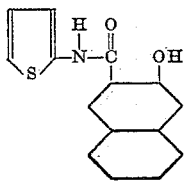

26.6 parts of tin chloride double salt of 2-aminothiophene is slurried under nitrogen in 100 parts of water and 90 parts of benzene and slowly treated, with cooling, with 120 parts of 5 N sodium hydroxide. The benzene layer is separated, dried over sodium sulfate and treated with 4 parts of pyridine, followed by 10.3 parts of 2-hydroxy-3-naphthoyl chloride. The product separates from solution upon treatment with petroleum solvent. It can be purified by dissolving in caustic and precipitating with dilute acid, followed by recrystallization from absolute alcohol.

*Example 2*

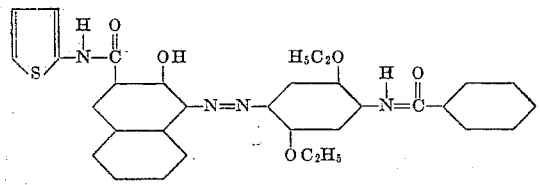

The product of Example 1 is padded onto cotton cloth from an alkaline solution and the color then developed by immersing the cotton cloth into a dye bath containing diazotized 4-benzoylamino-2,5-diethoxyaniline. A blue dye is obtained, having good fastness properties.

*Example 3*

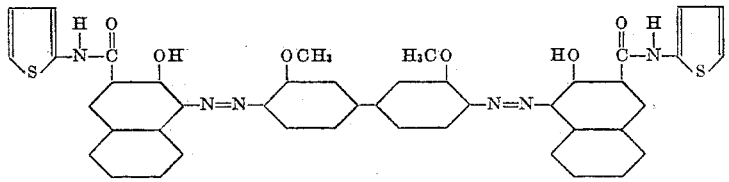

The procedure of Example 2 is repeated, replacing the diazo component with a corresponding amount of tetrazotized dianisidine. The cotton cloth is dyed navy-blue and the color shows good fastness properties.

*Example 4*

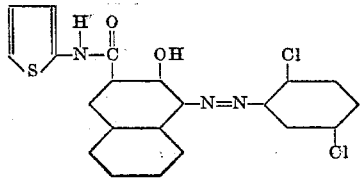

The procedure of Example 2 is followed, using as the diazo component, diazotized 4-methoxy-4'-aminodiphenylamine. A good dyeing of navy-blue is obtained, having good fastness properties.

*Example 5*

The procedure of Example 2 is followed, using as the diazo component, the diazotized 2-amino-4-chloroanisole. An excellent pink dyeing is obtained of good fastness properties.

*Example 6*

The procedure of Example 2 is followed, using, for the diazo component, diazotized 2,5-dichloroaniline. A bright scarlet dyeing is obtained with good fastness properties.

*Example 7*

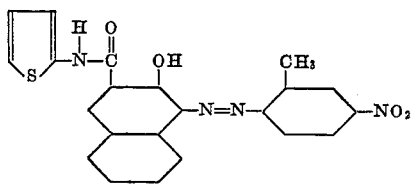

The procedure of Example 2 is followed, using, as the diazo component, diazotized 2-methyl-4-nitroaniline. A bluish-red dyeing is obtained of good fastness properties.

*Example 8*

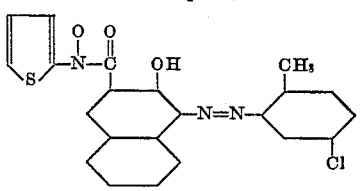

The procedure of Example 2 is followed, using, as the diazo component, diazotized 2-methyl-5-chloroaniline. A bright red dyeing is obtained which is much faster than the dyeings obtained when the coupling component is 2-hydroxy-3-naphthanilide.

*Example 9*

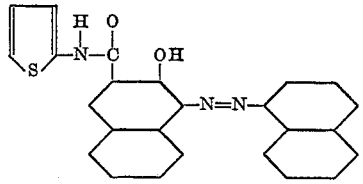

The procedure of Example 2 is followed, using, as the diazo component, diazotized alpha-naphthylamine. A bluish-red dyeing is obtained.

The dyeing procedures in Examples 2–9 can be varied by using the corresponding stabilized diazo compound obtained by reaction of the diazo compound with N-allylglycine. The stabilized diazo compounds are mixed with the coupling component and printed from a conventional printing paste onto cotton cloth. It is developed in the usual manner with hot acid vapors. The dyeings obtained are the same colors as those from padded cloth and show the same good fastness properties.

I claim:

1. The water-insoluble azo compounds having the following formula:

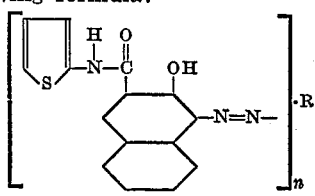

wherein R represents an aromatic carbocyclic radical free of water solubilizing groups and n is a positive integer less than 3.

2. The water-insoluble azo compounds having the following formula:

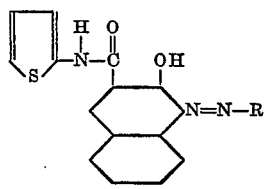

wherein R represents an aromatic carbocyclic radical free of water solubilizing groups.

3. The water-insoluble azo compound having the following formula:

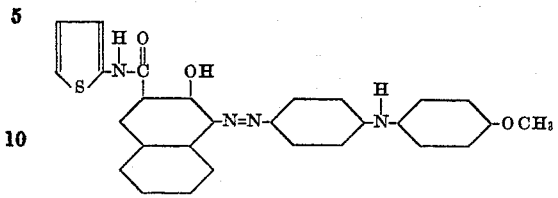

4. The water insoluble azo compound having the following formula:

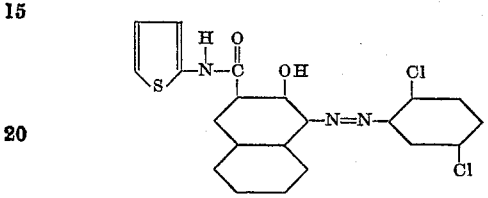

5. The water-insoluble azo compounds having the following formula:

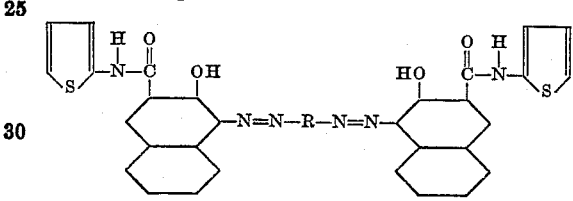

where R represents a divalent aromatic radical free of water solubilizing groups.

6. The water-insoluble azo compound having the following formula:

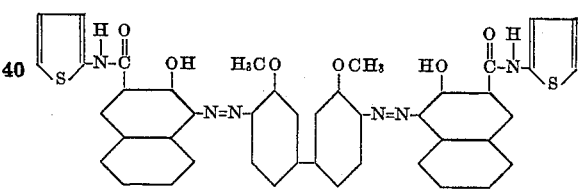

7. The water insoluble azo compound having the following formula:

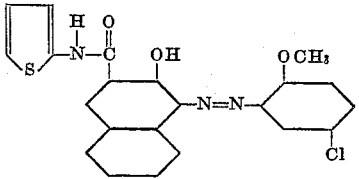

8. The water-insoluble azo compound having the following formula:

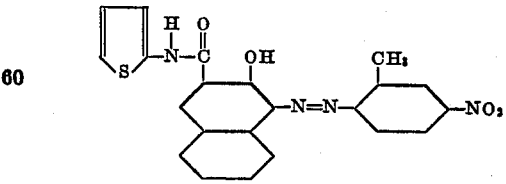

ROBERT SIDNEY LONG.

REFERENCES CITED

The following references are of record in the file of this patent:

UNITED STATES PATENTS

| Number | Name | Date |
| --- | --- | --- |
| 2,144,219 | Etzmiller | Jan. 17, 1939 |
| 2,443,598 | Cheney et al. | June 22, 1948 |
| 2,468,457 | Orem | Apr. 26, 1949 |